(12) United States Patent
Wang et al.

(10) Patent No.: US 10,221,370 B2
(45) Date of Patent: Mar. 5, 2019

(54) METHOD OF SEPARATING LIGNIN DERIVED COMPOUNDS FROM PYROLYSIS OIL

(71) Applicant: SHELL OIL COMPANY, Houston, TX (US)

(72) Inventors: Pen-Chung Wang, Houston, TX (US); Paul Richard Weider, Houston, TX (US); Robert Lawrence Blackbourn, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 518 days.

(21) Appl. No.: 14/207,736

(22) Filed: Mar. 13, 2014

(65) Prior Publication Data

US 2014/0259888 A1 Sep. 18, 2014

Related U.S. Application Data

(60) Provisional application No. 61/782,644, filed on Mar. 14, 2013.

(51) Int. Cl.

| *C13B 5/00* | (2011.01) |
|---|---|
| *C10L 1/02* | (2006.01) |
| *A23D 9/02* | (2006.01) |
| *A23D 9/007* | (2006.01) |
| *C10B 53/02* | (2006.01) |

(52) U.S. Cl.
CPC .............. *C10L 1/026* (2013.01); *A23D 9/007* (2013.01); *A23D 9/02* (2013.01); *C10B 53/02* (2013.01); *C10G 2300/1014* (2013.01); *C10G 2300/4043* (2013.01); *C10G 2400/04* (2013.01); *Y02E 50/14* (2013.01); *Y02E 50/32* (2013.01); *Y02P 30/20* (2015.11)

(58) Field of Classification Search
CPC ..................... Y02E 50/014; C10L 2200/0469
See application file for complete search history.

(56) References Cited

U.S. PATENT DOCUMENTS

| 3,549,319 | A | 12/1970 | Wilson et al. | |
|---|---|---|---|---|
| 4,209,647 | A | 6/1980 | Gallivan et al. | |
| 4,233,465 | A | 11/1980 | Gallivan et al. | |
| 4,508,886 | A | 4/1985 | Russell et al. | |
| 4,942,269 | A | 7/1990 | Chum et al. | |
| 5,395,455 | A * | 3/1995 | Scott | C07H 3/10 127/37 |
| 2007/0125369 | A1* | 6/2007 | Olson | C07H 1/00 127/37 |
| 2009/0253948 | A1* | 10/2009 | McCall | C10G 3/46 585/240 |
| 2012/0012035 | A1* | 1/2012 | Blank | C04B 24/18 106/802 |
| 2012/0122152 | A1* | 5/2012 | Blackbourn | C08H 8/00 435/41 |

FOREIGN PATENT DOCUMENTS

| WO | WO 2012092075 A1 * | 7/2012 | ......... B01D 53/1487 |
|---|---|---|---|
| WO | WO-2012092075 A1 * | 7/2012 | ......... B01D 53/1487 |

\* cited by examiner

*Primary Examiner* — Ellen M McAvoy
*Assistant Examiner* — Ming Cheung Po

(57) ABSTRACT

A novel method of separating bio oil (pyrolysis oil) into oxygenated rich species and lignin/phenolic based species in a highly efficient manner is provided. Lignin and phenolic fractions can be separated from light oxygenates from bio oil by use of reversible α-hydroxysulfonic acid.

25 Claims, 1 Drawing Sheet

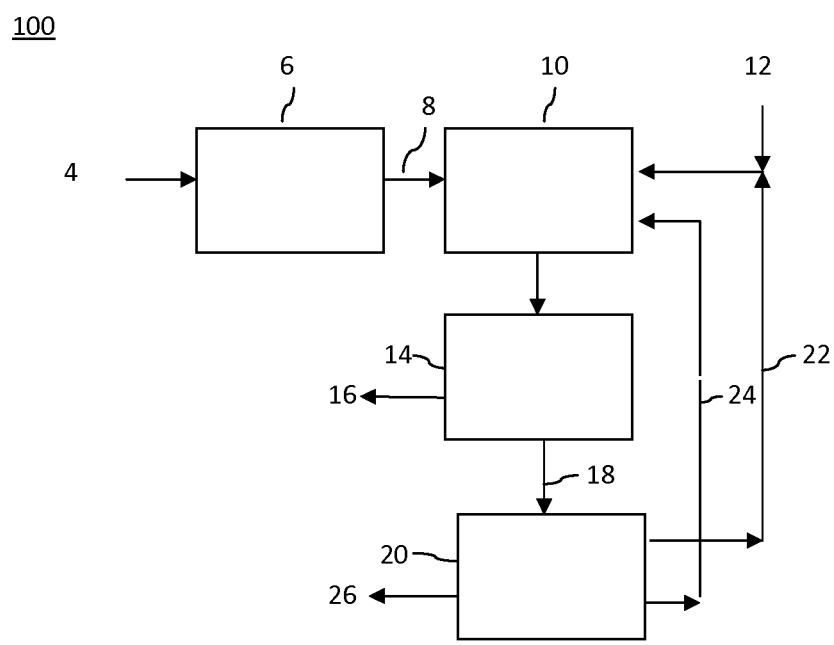

METHOD OF SEPARATING LIGNIN DERIVED COMPOUNDS FROM PYROLYSIS OIL

The present non-provisional application claims the benefit of pending U.S. Provisional Patent Application Ser. No. 61/782,644, filed Mar. 14, 2013, the entire disclosure of which is hereby incorporated by reference.

FIELD OF THE INVENTION

The invention relates to a process for separating lignin derived compounds from pyrolysis oil.

BACKGROUND OF THE INVENTION

Pyrolysis oil or bio oil has been studied as a possible low $CO_2$ foot print sustainable substitute for fossil fuels. It is formed by a process called "fast pyrolysis" where dry biomass is heated rapidly to temperature of 450-650° C. in the absence of oxygen, held for a short time (a few seconds or less), and rapidly cooled to produce a condensate. The condensate from this process contains a very high level of oxygenated components, phenolic/aromatic compounds and water in a viscous emulsion. Since the condensate is from a non-equilibrium process, the components are not stable with one another and the oil emulsion continues to degrade with time. This makes it distinctly different from petroleum based oils and has hampered the commercial implementation to date.

The "water" and other highly oxygenated molecules in pyrolysis oil are fully emulsified and do not phase separate readily like water does in the presence of standard fossil fuels. The density of pyrolysis oil is much higher than diesel. The oxygen content is about 40-50%, and no sulfur is detected normally. The cetane number is only about 10, whereas diesel engines typically operate in the 40-55 cetane number range. The viscosity increases to a maximum in period of 12 months due to continued polymerization. The pyrolysis oil is not stable with air and continues to de-gas upon storage. Pyrolysis oil cannot be readily blended with diesel.

Thus, stabilization of the bio-oil is essential to its utilization. Like crude oil, bio oil (pyrolysis oil) can be fractionalized and refined to yield products with specific properties and characteristics as required for various downstream options. U.S. Pat. Nos. 4,209,647, 4,508,886, 4,233,465 and 4,942,269 disclose methods for separating lignin and phenolic fractions from bio oil obtained by pyrolysis of lignocellulosic materials and the subsequent use of that fraction in making of phenol-formaldehyde resins. However, these processes involve a series of liquid and liquid extraction steps. The complexity and lengthy solvent extraction associated with a relatively low yield of the phenolic components limit the industrial applications of such a process.

SUMMARY OF THE INVENTION

Thus, it is highly desirable to develop an efficient process to separate light oxygenates from lignin derived compounds such as lignin and phenolics in a pyrolysis oil.

In an embodiment, a process for treating a pyrolysis oil is provided comprising;
(a) providing a pyrolysis oil;
(b) contacting said pyrolysis oil with at least one α-hydroxysulfonic acid under conditions effective to phase separate the pyrolysis oil into a water soluble phase containing sugars, organic acids, and carbonyl compounds and a water insoluble phase containing lignin and phenolic species;
(c) separating the water insoluble phase from the water soluble phase; and
(d) removing the α-hydroxysulfonic acid in its component form from the water soluble phase by heating and/or reducing pressure to produce an acid-removed water soluble phase substantially free of the α-hydroxysulfonic acid.

In yet another embodiment, a process for treating a pyrolysis oil comprising;
(a) providing a pyrolysis oil;
(b) contacting said pyrolysis oil with at least one α-hydroxysulfonic acid under conditions effective to phase separate the pyrolysis oil into a water soluble phase containing sugars, organic acids, and carbonyl compounds and a water insoluble phase containing lignin and phenolic species;
(c) separating the water insoluble phase from the water soluble phase;
(d) removing water from the water soluble phase; and
(e) removing the α-hydroxysulfonic acid in its component form from the water removed-soluble phase by heating and/or reducing pressure to produce an acid-removed water soluble phase substantially free of the α-hydroxysulfonic acid.

In another embodiment, a method comprises recycling the removed α-hydroxysulfonic acid to step (b) as components or in its recombined form.

In yet another embodiment, a method comprises generating the α-hydroxysulfonic acid from at least one carbonyl compound present in pyrolysis oil.

In yet another embodiment, a process for treating a pyrolysis oil is provided comprising;
(a) providing a pyrolysis oil containing anhydrosugars;
(b) contacting said pyrolysis oil with at least one α-hydroxysulfonic acid at a temperature in the range of 0 to 150 C thereby producing sugars and phase separating the pyrolysis oil into a water soluble phase containing sugars, organic acids, and carbonyl compounds and a water insoluble phase containing lignin and phenolic species;
(c) separating the water insoluble phase from the water soluble phase; and
(d) removing the α-hydroxysulfonic acid in its component form from the water soluble phase by heating and/or reducing pressure to produce an acid-removed water soluble phase substantially free of the α-hydroxysulfonic acid.

The features and advantages of the invention will be apparent to those skilled in the art. While numerous changes may be made by those skilled in the art, such changes are within the spirit of the invention.

BRIEF DESCRIPTION OF THE DRAWING

This drawing illustrates certain aspects of some of the embodiments of the invention, and should not be used to limit or define the invention.

The FIGURE schematically illustrates a block flow diagram of an embodiment of the treatment process of this invention.

DETAILED DESCRIPTION OF THE INVENTION

The present invention relates to a new method of separating bio oil (pyrolysis oil) into oxygenated rich species and lignin derived compounds in a highly efficient manner. It was found that the separation of lignin derived compounds (lignin and phenolic fractions) from bio oil by use of reversible α-hydroxysulfonic acid remarkably increase the extraction efficiency. Under the present inventive method, the anhydro sugars in the bio oil were also converted to fermentable sugars.

While the exact composition of pyrolysis oil depends on the biomass source and processing conditions, a typical composition can be: water 20-28%; suspended solids and pyrolitic lignin 22-36%; hydroxyacetaldehyde 8-12%; levoglucosan (a sugar oligomer) 3-8%; acetic acid 4-8%; hydroxyacetone 3-6%; cellubiosan (a sugar oligomer) 1-2%; glyoxal 1-2%; formaldehyde 3-4%; formic acid 3-6%. The pyrolysis oil is acidic with a pH usually in the range of 2-3.

As noted above, there can be substantial quantities of aldehydes and ketones that are generated during bio-oil manufacture with certain feedstocks and processing conditions. The hydroxyl aldehydes and ketones present in bio oil are combined with $SO_2$ and water to generate α-hydroxysulfonic acids in situ. Alternatively, the α-hydroxysulfonic acids may be prepared separately and added to the pyrolysis oil. A general reaction of carbonyl compounds is to react with $SO_2$ and water to rapidly form α-hydroxy sulfonic acids under very mild conditions. The presence of α-hydroxysulfonic acids in bio oil eliminates the surfactant properties of bio oil, makes the water very acidic (pH<1), and drives the lignin and phenolic based species into a separate phase. Once the water is separated, the carbonyls can be regenerated by heating the mixture or reducing pressure, allowing the volatile $SO_2$ to depart the reaction zone.

The alpha-hydroxysulfonic acids of the general formula

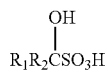

where $R_1$ and $R_2$ are individually hydrogen or hydrocarbyl with up to about 9 carbon atoms that may or may not contain oxygen, preferably derived from the carbonyl compounds in the bio oil. The alpha-hydroxysulfonic acid can be a mixture of alpha-hydroxysulfonic acids. The acid is generally formed by reacting at least one carbonyl compound or precursor of carbonyl compound (that can be present in bio-oil) with sulfur dioxide or precursor of sulfur dioxide (e.g., sulfur and oxidant, or sulfur trioxide and reducing agent) and water according to the following general equation 1.

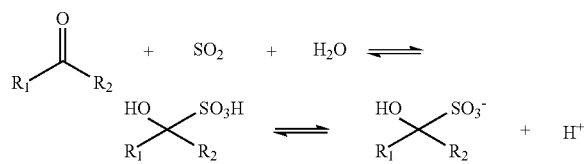

where $R_1$ and $R_2$ are individually hydrogen or hydrocarbyl with up to about 9 carbon atoms or a mixture thereof as described above.

The carbonyl compounds and its precursors can be a mixture of compounds described above. For example, the mixture can be a carbonyl compound or a precursor such as, for example, trioxane which is known to thermally revert to formaldehyde at elevated temperatures or an alcohol that may be converted to the aldehyde by dehydrogenation of the alcohol to an aldehyde. An example of a source of carbonyl compounds may be a mixture of hydroxyacetaldehyde and other aldehydes and ketones produced from fast pyrolysis oil.

The preparation of α-hydroxysulfonic acids by the combination of an organic carbonyl compounds, $SO_2$ and water is a general reaction and is illustrated in equation 2 for acetone.

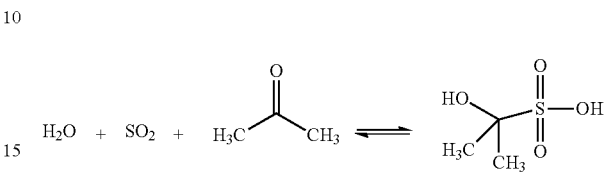

The α-hydroxysulfonic acids appear to be as strong as, if not stronger than, HCl since an aqueous solution of the adduct has been reported to react with NaCl freeing the weaker acid, HCl (see U.S. Pat. No. 3,549,319). The reaction in equation 1 is a true equilibrium, which results in facile reversibility of the acid. That is, when heated, the equilibrium shifts towards the starting carbonyl, sulfur dioxide, and water (component form). If the volatile components (e.g. sulfur dioxide) is allowed to depart the reaction mixture via vaporization or other methods, the acid reaction completely reverses and the solution becomes effectively neutral. Thus, by increasing the temperature and/or lowering the pressure, the sulfur dioxide can be driven off and the reaction completely reverses due to Le Châtelier's principle, the fate of the carbonyl compound is dependant upon the nature of the material employed. If the carbonyl is also volatile (e.g. acetaldehyde), this material is also easily removed in the vapor phase. Thus, the carbonyl can be removed by conventional means, e.g., continued application of heat and/or vacuum, steam and nitrogen stripping, solvent washing, centrifugation, etc. Therefore, the formation of these acids is reversible in that as the temperature is raised, the sulfur dioxide and/or aldehyde and/or ketone can be flashed from the mixture and condensed or absorbed elsewhere in order to be recycled. It has been found that these reversible acids, which are approximately as strong as strong mineral acids, are effective in separating water and lights oxygenates from lignin derived compounds (lignin and phenolic based species). "Light oxygenates" refers to lower molecular weight oxygenates (oxygenated hydrocarbons), such as glycol, hydroxyacetaldehyde, acetic acid, anhydrosugars, and other molecules that typically have higher oxygen to carbon ratio (typically around 1:1 to 1:2) such as levoglucosan) compared to lignin-based aromatics (typically 9:1 to 9:2).

In some embodiments, the reactions described below are carried out in any system of suitable design, including systems comprising continuous-flow (such as CSTR and plug flow reactors), batch, semi-batch or multi-system vessels and reactors and packed-bed flow-through reactors. For reasons strictly of economic viability, it is preferable that the invention is practiced using a continuous-flow system at steady-state equilibrium.

The FIGURE shows an embodiment of the present invention 100 for treating pyrolysis oil. In this embodiment, biomass (typically lignocellulosic) 4 is subjected to pyrolysis 6 to produce bio-oil (or pyrolysis oil) 8 containing anhydrosugars, organic acids, carbonyl compounds (such as ketones and aldehydes), water, lignin and phenolic species. The pyrolysis oil is provided to the acid contact/treatment zone 10 containing α-hydroxysulfonic acid where the pyrolysis oil is allowed to contact with a solution containing at least one α-hydroxysulfonic acid thereby allowing to phase separate the pyrolysis oil, in a separation zone 14, into a water soluble phase 18 containing sugars, organic acids, and carbonyl compounds and a water insoluble phase 16 containing lignin and phenolic species. The acid treatment system may comprise a number of components including in situ generated α-hydroxysulfonic acid. The term "in situ" as used herein refers to a component that is produced within the overall process; it is not limited to a particular reactor for production or use and is therefore synonymous with an in process generated component. Water is preferably removed from the water soluble phase 18 (not shown) and α-hydroxysulfonic acid is removed as its component form by generating carbonyl compounds by heating or reducing pressure, in a acid removal zone 20, and allowing the volatile $SO_2$ to be removed 22. The carbonyl compound can be recycled to the treatment zone 10, via recycle stream 24 and $SO_2$ can be recycled to the treatment zone 10, via recycle stream 22 for in-situ generation of the α-hydroxysulfonic acid. Additional or initial $SO_2$ or precursor thereof may optionally be added via 12 as necessary to generate sufficient α-hydroxysulfonic acid. Additional or initial carbonyl compounds or its precursor may also optionally be added as necessary to generate sufficient α-hydroxysulfonic acid (not shown). Bio-oil stream enriched in light oxygenates 26 containing sugar and acids can be obtained via the process of the invention that can be subsequently be used for other processes to make chemicals or further separated for recovery. The zones may be in the same reactor and/or same zone or in different reactors.

The carbonyl compound with sulfur dioxide and water should be added to in an amount and under conditions effective to form alpha-hydroxysulfonic acids. The temperature and pressure of the acid treatment should be in the range to form alpha-hydroxysulfonic acids and to effectively separate the bio-oil into water soluble phase and water insoluble phase. The amount of carbonyl compound or its precursor and sulfur dioxide should be to produce alpha-hydroxysulfonic acids in the range from about 1 wt %, preferably from about 5 wt %, most preferably from about 10 wt %, to about 55 wt %, preferably to about 50 wt %, more preferably to about 40 wt %, based on the total solution. For the reaction, excess sulfur dioxide is not necessary, but any excess sulfur dioxide may be used to drive the equilibrium in eq. 1 to favor the acid form at elevated temperatures. The contacting conditions may preferably be carried out at a temperature in the range from about 0° C. to about 150° C. and a pressure in the range from 0 to about 13.8 barg (200 psig) depending on the alpha-hydroxysulfonic acid used. Contacting may be conducted at temperatures preferably at least from about 50° C. using the alpha-hydroxysulfonic acid in-situ generated from bio-oil, although such temperature may be as low as room temperature depending on the pressure used. The contacting condition may range preferably up to and including about 150° C. depending on the alpha-hydroxysulfonic acid and pressure used. In a more preferred condition the temperature is at least from about 80° C., most preferably at least about 100° C. In a more preferred condition the temperature range up to and including about 90° C. to about 120° C. The reaction is preferably conducted at as low a pressure as possible, given the requirement of containing the excess sulfur dioxide. The reaction may also be conducted at a pressure as low as about 1 barg, preferably about 4 barg, to about pressure of as high as up to 10 barg The temperature and pressure to be optimally utilized will depend on the particular alpha-hydroxysulfonic acid chosen and optimized based on economic considerations of metallurgy and containment vessels as practiced by those skilled in the art. The temperature and pressure of the separation zone may be the same or different temperature and pressure as the contact zone, but generally in the same range.

In general, the whole pyrolysis oil can be first dissolved in water preferably in an oil:water ratio in the range of 1:5 to 1:0 by weight. $SO_2$ can then be added to the mixture to generate α-hydroxysulfonic acids in situ. The treatment step can be typically carried out at a temperature in the rang described above and a pressure described above. After treatment, upon standing, the bio oil and water mixture then separates into two phases, the water soluble phase and water insoluble phase (lignin/phenolic species). The water soluble phase contains sugars, organic acids, ketones and aldehydes.

In some embodiments, a plurality of vessels may be used to carry out the acid treatment. These vessels may have any design capable of carrying out a acid treatment. Suitable vessel designs can include, but are not limited to, batch, trickle bed, co-current, counter-current, stirred tank, or fluidized bed reactors. Staging of reactors can be employed to arrive at the most economical solution. Suitable reactor designs can include, but are not limited to, a backmixed reactor (e.g., a stirred tank, a bubble column, and/or a jet mixed reactor) may be employed if the viscosity and characteristics of the partially digested bio-based feedstock and liquid reaction media is sufficient to operate in a regime where bio-based feedstock solids are suspended in an excess liquid phase (as opposed to a stacked pile digester). It is also conceivable that a trickle bed reactor could be employed with the bio oil present as the stationary phase and a solution of α-hydroxysulfonic acid passing over the material.

The residual alpha-hydroxysulphonic acid can be removed by application of heat and/or vacuum from the acid treated bio oil to reverse the formation of alpha-hydroxysulphonic acid to its starting material to produce a stream containing the acid-treated bio oil, light oxygenates stream or phenolic species stream substantially free of the α-hydroxysulfonic acid. In particular, the product stream is substantially free of alpha-hydroxysulphonic acid, meaning no more than about 2 wt % is present in the product stream, preferably no more than about 1 wt %, more preferably no more than about 0.2 wt %, most preferably no more than about 0.1 wt % present in the product stream. The temperature and pressure will depend on the particular alpha-hydroxysulphonic acid used and minimization of temperatures employed are desirable to preserve the sugars obtain in treatment reactions. Typically the removal may be conducted at temperatures in the range from about 50° C., preferably from about 80° C., more preferably from 90° C., to about 110° C., up to about 150° C. The pressure in the range of from about 0.1 bara to about 3 bara, more preferably from 1 bara (atmospheric) to about 2 bara. It can be appreciated by a person skill in the art that the treatment contact zone 10, the separation zone 14, and the acid removal zone 20 can occurred in the same vessel or a different vessel or in a number of different types of vessels depending on the reactor configuration and staging as long as the system is designed so that the reaction is conducted under condition favorable for the formation and maintenance of the alpha-hydroxysulfonic acid and removal favorable for the reverse reaction and the separation of the phases. As an example, the reaction in the contact vessel 10 can be operated at approximately 100° C. and a pressure of 4 barg in the presence of alpha-hydroxyethanesulfonic acid, separation vessel 14 at approximately 100° C. and a pressure of 4 barg, and the acid removal vessel 20 can be operated at approximately 110° C. and a pressure of 0.5 barg. It is further contemplated that the reversion can be favored by the reactive distillation of the formed alpha-hydroxysulfonic acid. In the recycling of the removed acid, optionally additional carbonyl compounds, $SO_2$, and water may be added as necessary. The vessels above may be the same vessel or different vessel.

It has been found that upon contact of the pyrolysis oil (bio oil) containing anhydrosugars with the alpha-hydroxy-ethanesulfonic acid, the anhydrosugars were converted to sugars. It has also been found that the process and the conditions described above converts the anhydrosugars to sugars.

Thus, in another embodiment, a process for treating a pyrolysis oil is provided comprising;
(a) providing a pyrolysis oil containing anhydrosugars;
(b) contacting said pyrolysis oil with at least one α-hydroxysulfonic acid at a temperature in the range of 0 to 150° C. thereby producing sugars and phase separating the pyrolysis oil into a water soluble phase containing sugars, organic acids, and carbonyl compounds and a water insoluble phase containing lignin and phenolic species;
(c) separating the water insoluble phase from the water soluble phase; and
(d) removing the α-hydroxysulfonic acid in its component form from the water soluble phase by heating and/or reducing pressure to produce an acid-removed water soluble phase substantially free of the α-hydroxysulfonic acid.

While the invention is susceptible to various modifications and alternative forms, specific embodiments thereof are shown by way of examples herein described in detail. It should be understood, that the detailed description thereto are not intended to limit the invention to the particular form disclosed, but on the contrary, the intention is to cover all modifications, equivalents and alternatives falling within the spirit and scope of the present invention as defined by the appended claims. The present invention will be illustrated by the following illustrative embodiment, which is provided for illustration only and is not to be construed as limiting the claimed invention in any way.

Illustrative Embodiments

General Methods and Materials

In the examples, commercial bio oil from BTG biomass technology was used. In general, the whole pyrolysis oil was first prepared to an oil:water ratio in the range of 1:5 (water added) to 1:0 (no water added) by weight, preferably in the range of an oil:water ratio of 1:0.25 to 1:0.75 by weight. $SO_2$ was then added to the mixture to generate α-hydroxysulfonic acids in situ. The treatment step is typically carried out at a temperature ranging from 0° C. to 120° C. and a pressure ranging from 0 to 200 psi.

EXAMPLES

Example 1

Into a 600 ml autoclave equipped with a Dicomp IP probe 90.0 grams of pyrolysis oil (bio oil from BTG Bioliquids) were placed. To this added approximately 60.0 grams of D.I. water with stirring. A single ended Hoke vessel charged with approximately 12.45 grams of sulfur dioxide was inverted and connected to the top of the reactor. The $SO_2$ was added to the reaction system in a single portion. The reaction mixture is stirred (1000 to 1500 rpm) and begin acquisition of IR spectra. The reaction mixture is then heated to the target temperature of 100° C. and held for a period of one hour. The heating is discontinued and the reaction cooled to room temperature using a flow of compressed air. The reactor was vented and then purged with a slow nitrogen stream for a few minutes to eliminate any sulfur dioxide in the gas cap. After treatment, upon standing, the bio oil and water mixture then separated into two phases, the water soluble phase and water insoluble phase (lignin/phenolic species). The water soluble phase contains sugars, organic acids, ketones and aldehydes. Samples from both water soluble and insoluble phases were analyzed by C13 NMR and HPLC to determine the contents in both phases and confirm the separation. The hydrolysis of anhydro sugars in bio oil to fermentable sugars was also confirmed by HPLC. After separation and drying, 26.0 grams of solid material were isolated along with 124.0 grams of liquid material.

Example 2

The same experiment described above was repeated at 50° C. for one hour. 25.88 of solid material were isolated along with 124.12 grams of liquid material. Upon standing, the bio oil and water mixture then separated into two phases, the water soluble phase and water insoluble phase (lignin/phenolic species). Samples from both water soluble and insoluble phases were analyzed by C13 NMR and HPLC to determine the contents in both phases and confirm the separation. The hydrolysis of anhydro sugars in bio oil to fermentable sugars was also confirmed by HPLC.

We claim:
1. A method for treating a pyrolysis oil comprising;
(a) providing a pyrolysis oil;
(b) contacting said pyrolysis oil with at least one α-hydroxysulfonic acid under conditions effective to lower the pH to induce phase separation of the pyrolysis oil into a water soluble phase containing sugars, organic acids, and carbonyl compounds and a water insoluble phase containing lignin and phenolic species derived from pyrolysis oil;
(c) separating the water insoluble phase from the water soluble phase; and
(d) removing the α-hydroxysulfonic acid in its component form from the water soluble phase by heating and/or reducing pressure to produce an acid-removed water soluble phase substantially free of the α-hydroxysulfonic acid.

2. The method of claim 1 wherein the water is removed from the acid-removed water soluble phase and carbonyl compounds are regenerated by heating or reducing pressure from said water soluble phase.

3. The method of claim 1 wherein the α-hydroxysulfonic acid is in-situ generated.

4. The method of claim 2 wherein the α-hydroxysulfonic acid is produced from (a) a carbonyl compound or a precursor to a carbonyl compound present in the pyrolysis oil with (b) sulfur dioxide or a precursor to sulfur dioxide and (c) water.

5. The method of claim 4 wherein the carbonyl compound or a precursor to a carbonyl compound is at least in part derived from the pyrolysis oil.

6. The method of claim 1 wherein the contacting in step (b) is carried out at a temperature in the range from about 0° C. to about 150° C. and a pressure in the range from 0 to about 13.8 barg.

7. The method of claim 4 wherein the α-hydroxysulfonic acid is present in an amount of from about 1 to 55 wt., based on total solution in step (b).

8. The method of claim 1 wherein at least one α-hydroxysulfonic acids has the general formula $$\underset{R_1R_2CSO_3H}{\overset{OH}{|}}$$

where $R_1$ and $R_2$ are individually hydrogen or hydrocarbyl with up to about 9 carbon atoms that may or may not contain oxygen.

9. The method of claim 1 wherein at least one sugar is recovered from the acid-removed water soluble phase.

10. The method of claim 2 wherein $SO_2$ is removed from the water soluble phase.

11. The method of claim 6 wherein the contacting in step (b) is carried out at a temperature in the range from about 50° C. to about 120° C. and a pressure in the range from 1 barg to about 4 barg.

12. The method of claim 1 wherein the ratio of pyrolysis oil to water is in the range of 1:0 to 1:5.

13. A method for treating a pyrolysis oil comprising;
(a) providing a pyrolysis oil;
(b) contacting said pyrolysis oil with at least one α-hydroxysulfonic acid under conditions effective to lower the pH to induce phase separation of the pyrolysis oil into a water soluble phase containing sugars, organic acids, and carbonyl compounds and a water insoluble phase containing lignin and phenolic species derived from pyrolysis oil;
(c) separating the water insoluble phase from the water soluble phase;
(d) removing water from the water soluble phase; and concurrently
(e) removing the α-hydroxysulfonic acid in its component form from the water soluble phase by heating and/or reducing pressure to produce an acid-removed water soluble phase substantially free of the α-hydroxysulfonic acid.

14. A process for treating a pyrolysis oil is provided comprising;
(a) providing a pyrolysis oil containing anhydrosugars;
(b) contacting said pyrolysis oil with at least one α-hydroxysulfonic acid at a temperature in the range of 0 to 150° C. thereby producing sugars and lowering the pH to induce phase separation of the pyrolysis oil into a water soluble phase containing sugars, organic acids, and carbonyl compounds and a water insoluble phase containing lignin and phenolic species derived from pyrolysis oil;
(c) separating the water insoluble phase from the water soluble phase; and
(d) removing the α-hydroxysulfonic acid in its component form from the water soluble phase by heating and/or reducing pressure to produce an acid-removed water soluble phase substantially free of the α-hydroxysulfonic acid.

15. The method of claim 14 wherein the water is removed from the water soluble phase and carbonyl compounds are regenerated by heating or reducing pressure from said water soluble phase.

16. The method of claim 14 wherein the α-hydroxysulfonic acid is in-situ generated.

17. The method of claim 15 wherein the α-hydroxysulfonic acid is produced from (a) a carbonyl compound or a precursor to a carbonyl compound present in the pyrolysis oil with (b) sulfur dioxide or a precursor to sulfur dioxide and (c) water.

18. The method of claim 17 wherein the carbonyl compound or a precursor to a carbonyl compound is at least in part derived from the pyrolysis oil.

19. The method of claim 14 wherein the contacting in step (b) is carried out at a pressure in the range from 0 to about 13.8 barg.

20. The method of claim 18 wherein the α-hydroxysulfonic acid is present in an amount of from about 1 to 55 wt., based on total solution in step (b).

21. The method of claim 14 wherein at least one α-hydroxysulfonic acids has the general formula $$\underset{R_1R_2CSO_3H}{\overset{OH}{|}}$$

where $R_1$ and $R_2$ are individually hydrogen or hydrocarbyl with up to about 9 carbon atoms that may or may not contain oxygen.

22. The method of claim 14 wherein at least one sugar is recovered from the acid-removed water soluble phase.

23. The method of claim 15 wherein $SO_2$ is removed from the water soluble phase.

24. The method of claim 20 wherein the contacting in step (b) is carried out at a temperature in the range from about 50° C. to about 120° C. and a pressure in the range from 1 barg to about 4 barg.

25. The method of claim 14 wherein the ratio of pyrolysis oil to water is in the range of 1:0 to 1:5.

* * * * *